Feb. 24, 1931. C. E. DAVIS 1,793,590
CHAIN TOOL
Filed Feb. 11, 1929
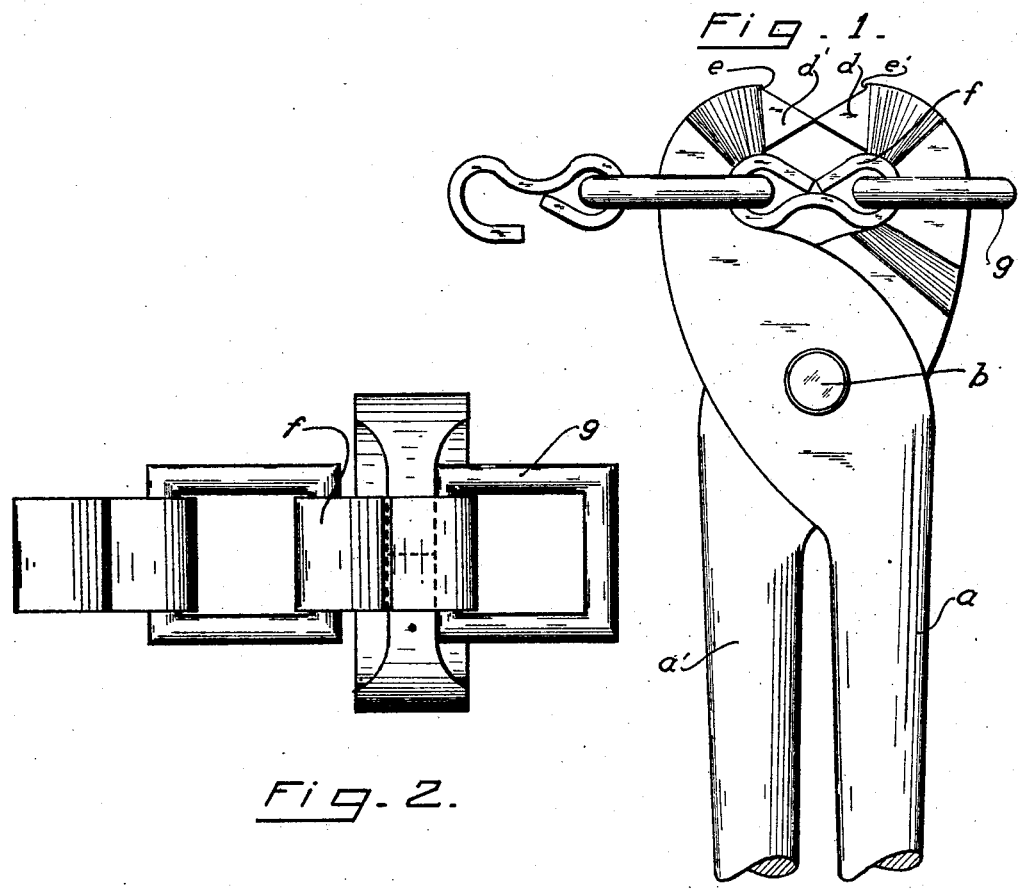
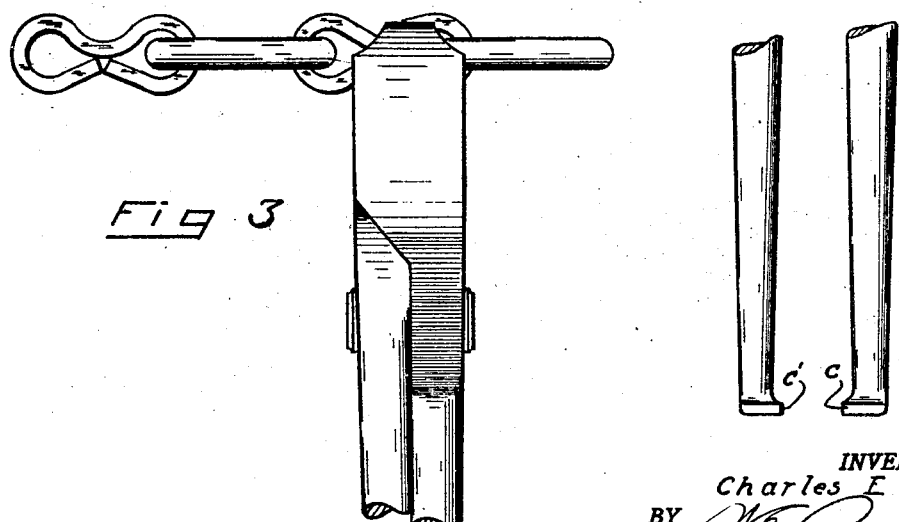
INVENTOR
Charles E. Davis
BY
ATTORNEY Patented Feb. 24, 1931

1,793,590

UNITED STATES PATENT OFFICE

CHARLES E. DAVIS, OF PORTLAND, OREGON

CHAIN TOOL

Application filed February 11, 1929. Serial No. 339,128.

My invention relates to tools adapted to aid in the repair or replacement of chain links and is specifically designed to perform this function with chains comprising so-called Jackson links, which latter chains are commonly used in harvesting and threshing machines, and other machines adapted for heavy duty, and because of such severe conditions are subject to breakage and unusual elongation.

In machines of this character such chains are housed in and when breakdowns occur in operation, relatively large crews are held up for a considerable period and considerable damage results from making such breakdown repairs. The common manner of repairing such links is to spread the engaging portions apart by a tapered tool such as a chisel or punch driven by a hammer. The difficulty of making such repairs, even when such machine is out of operation, results in necessary repairs being put off, and severe injury results from such delay.

I have discovered that such links can be removed or adjusted by use of a pair of long-handled jaw tools resembling nippers by which rivets can be nipped from such links, the latter can be spread apart and replaced and the new links clinched within a few minutes without a great deal of difficulty and without injury to such chains or adjacent devices.

For convenience of operation, one or both of the handles of such tools terminates in a narrow point, the tip of which carries a laterally extending projection adapted to engage the spaced ends of such chains in assembling and to draw such ends together.

The details of such chain tools are hereinafter described with reference to the accompanying drawings, in which:

Fig. 1 is a foreshortened elevation of such tools shown engaging one of the links of a Jackson chain to clinch the latter;

Fig. 2 is a plan view of such device with the chain tools in position to spread one of the links for disengagement; and Fig. 3 is a fragmentary side elevation of the parts arranged as in Fig. 2.

My improved chain tools comprise a pair of pivoted members $a$ and $a'$ cooperating together and connected by a pin $b$. Such members at one side of the pivot are formed into long tapering handles which terminate in outstanding projections $c$—$c'$, which are adapted to be used as a pry to engage the ends of a chain to draw them into engagement with each other. The members $a$—$a'$ at the opposite side of such pivot are formed to constitute cooperating jaws and terminate at wedge-shaped laterally arranged points $d$—$d'$. Such wedge-shaped points are provided at their necks with relatively lateral outstanding shoulders $e$, as shown in Fig. 1, which, when the jaws are in engagement, as shown in such figure, are spaced apart exactly the width of the link $f$ of such Jackson chain, as shown in Fig. 2. They are tapered a distance sufficient to lift one end of such link $f$ to permit one of the annular rings $g$ to be removed from engagement therewith. In the drawings the tool and the links are shown full scale, as for use in a harvester or threshing machine, and the base of the tapered portion of such points $d$—$d'$ is made substantially three-eighths of an inch, and the rings $g$ are approximately one-fourth of an inch in thickness and thus when one end of the link has moved from place a gap is formed approximately five-sixteenths of an inch in width, which permits the ring $g$ to be passed therethru.

The purpose of the shoulders $e$ is to engage the sides of the link $f$, as shown in Fig. 2, so that the wedge-shaped ends $d$—$d'$ of such tool will each enter the link exactly the same distance and the sharpened edges thereof will meet on the center line of the link $f$. Thus the portion of the link moved out of clinched position will be lifted uniformly across the entire width of the link and the groove will be formed of uniform width. Such wedge-shaped ends $d$—$d'$ are made substantially narrower than the remainder of such jaws, as is shown in Fig. 2, and such portions are approximately three-eighths of an inch in width, as this is the distance between the outer edge of the annular rings $g$ and the abutting edges of the link $f$. Thus such wedge-shaped portions are adapted to extend under only one-half of the link to unclinch the same.

Immediately interiorly of such shoulders *e* the jaws of such tool are thickened and are formed to define an elongated pocket having end portions the same shape as a clinched link *f*, the major dimensions of such pocket extending in a plane normal to the major dimensions of such tool. Such wedge-shaped portions *d—d'* also extend in a plane normal to the major dimension of such tool and parallel to the major dimension of such pocket. Such tool thus is adapted to be used with the handle portions at right angles to the chain. This is to permit such tool to operate upon the chains of harvesters and threshers from above, such chains being enclosed at the sides, making repairs difficult.

I claim:

1. Pliers for cutting, separating and closing the links of a chain provided with periodic links each made up of a single section of flat, flexible material formed into two continuous adjacent loops the ends of such section being in abutment and arranged intermediate such loops, the latter encircling annular link elements of greater width than such flexible links, such pliers comprising a pair of elongated pivotally connected members formed at one end into cooperating jaws of substantially uniform proportions, each of such jaws terminating in a narrowed sharp-edged wedge-shaped portion substantially as wide as the spacing between the point of abutment in such flexible link and the exterior of such annular link and of a length greater than one-half of the width of such annular link and abrupt lateral shoulders formed upon such narrowed portions and intermediate the ends thereof spaced apart a distance equal to the width of such flexible links.

2. Pliers for cutting, separating and closing the links of a chain provided with periodic links each made up of a single section of flat, flexible material formed into two continuous adjacent loops the ends of such section being in abutment and arranged intermediate such loops, the latter encircling annular link elements of greater width than such flexible links, such pliers comprising a pair of elongated pivotally connected members formed at one end into cooperating jaws of substantially uniform proportions, each of such jaws terminating in a narrowed sharp-edged wedge-shaped portion substantially as wide as the spacing between the point of abutment in such flexible link and the exterior of such annular link and of a length greater than one-half of the width of such annular link and abrupt lateral shoulders formed on opposite sides of each of such narrowed portions and intermediate the ends thereof spaced apart a distance equal to the width of such flexible links.

3. Pliers for cutting, separating and closing the links of a chain provided with periodic links each made up of a single section of flat, flexible material formed into two continuous adjacent loops the ends of such section being in abutment and arranged intermediate such loops, the latter encircling annular link elements of greater width than such flexible links, such pliers comprising a pair of elongated pivotally connected members formed at one end into cooperating jaws of substantially uniform proportions, each of such jaws terminating in a narrowed sharp-edged wedge-shaped portion substantially as wide as the spacing between the point of abutment in such flexible link and the exterior of such annular link and of a length greater than one-half of the width of such annular link and the portions of such jaw intermediate such wedge-shaped portions and the pivot thereof being formed to define an interiorly elongated pocket, the major dimension of which extends substantially parallel to such wedge-shaped portions, the portions of such jaws defining such pocket being of substantially greater width than thickness of such latter portions.

4. Pliers for cutting, separating and closing the links of a chain provided with periodic links each made up of a single section of flat, flexible material formed into two continuous adjacent loops the ends of such section being in abutment and arranged intermediate such loops, the latter encircling annular link elements of greater width than such flexible links, such pliers comprising a pair of elongated pivotally connected members formed at one end into cooperating jaws of substantially uniform proportions, each of such jaws terminating in a narrowed sharp-edged wedge-shaped portion substantially as wide as the spacing between the point of abutment in such flexible link and the exterior of such annular link and of a length greater than one-half of the width of such annular link, abrupt lateral shoulders formed upon such narrowed portions and intermediate the ends thereof spaced apart a distance equal to the width of such flexible links.

In testimony whereof I affix my signature.

CHARLES E. DAVIS.